US008507867B1

(12) United States Patent
Clement et al.

(10) Patent No.: US 8,507,867 B1
(45) Date of Patent: Aug. 13, 2013

(54) RADIOMETRIC CARGO SECURITY DEVICE

(75) Inventors: Russel E. Clement, El Cajon, CA (US); Ayax D. Ramirez, Chule Vista, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 300 days.

(21) Appl. No.: 12/899,602

(22) Filed: Oct. 7, 2010

(51) Int. Cl.
*G01J 5/02* (2006.01)

(52) U.S. Cl.
USPC .......................................................... 250/349

(58) Field of Classification Search
USPC ............. 250/349, 340, 339.06, 341.4, 338.11
See application file for complete search history.

(56) References Cited

U.S. PATENT DOCUMENTS

| | | | | |
|---|---|---|---|---|
| 3,208,447 | A | 9/1965 | Laslo | |
| 4,975,573 | A * | 12/1990 | Girard | 250/252.1 |
| 5,406,073 | A | 4/1995 | Sharp et al. | |
| 5,729,199 | A | 3/1998 | Cooper et al. | |
| 5,939,982 | A | 8/1999 | Gagnon et al. | |
| 7,095,326 | B2 | 8/2006 | Young et al. | |
| 7,106,172 | B2 | 9/2006 | Neveux et al. | |
| 7,372,366 | B2 | 5/2008 | Lyon et al. | |
| 7,375,613 | B2 | 5/2008 | Shelley et al. | |
| 7,397,377 | B1 | 7/2008 | Young et al. | |
| 7,748,623 | B2 | 7/2010 | Barber | |
| 2009/0072146 | A1 * | 3/2009 | Youngner et al. | 250/339.06 |
| 2010/0163731 | A1 | 7/2010 | Haran et al. | |

OTHER PUBLICATIONS

Buckley, H., On the Radiation from the Inside of a Circular Cylinder, Philosophical Magazine, vol. 4, No. 23, pp. 753-762 (1927).
Buckley, H., On the Radiation from the Inside of a Circular Cylinder, Philosophical Magazine, vol. 6, No. 36, pp. 447-457 (1927).
Michaud, M., Facteur d'emission des Cavities des Formes Geometriques simples, Compt.rend. 226, pp. 999-1000 (1948).
Vollmer, J., Study of the Effective Thermal Emittance of Cylindrical Cavities, J. Opt Soc. Am. 926, pp. 926-932 (1957).
Gouffe, A. 1945, Revue D'Optique, 24, No. 1, pp. 1-10.
Stierwalt, D.L. et al. (1963), Measurement of the Infrared Spectral Absorptance of Optical Materials, Applied Optics, vol. 2, No. 11, pp. 1169-1173.
Clement, R.E. et al. High Purity ZnS/Ge Interference Filter Emittance, Proceedings of the IRIS Conference on Materials, 1999.

* cited by examiner

*Primary Examiner* — David Porta
*Assistant Examiner* — Faye Boosalis
(74) *Attorney, Agent, or Firm* — Kyle Eppele; Stephen E. Baldwin

(57) ABSTRACT

Detection of a breach in security of an enclosure, such as a shipping enclosure, is indicated by detection of a change in a closed status. A detector enclosure is provided with a window opening in the detector enclosure. A reference body having an image slit is accessible from within the detector enclosure, and a radiation detector is used to alternately receive radiation through the window opening in the detector and from the reference body through the image slit. An indication of the two received radiation levels or a difference between the received radiation levels is used to provide an indication of a change in the closed status of the enclosure.

10 Claims, 3 Drawing Sheets

RADIOMETRIC CARGO SECURITY DEVICE

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100346.

BACKGROUND

Thermal radiant properties of an object can be characterized by measuring its emissivity relative to a reference black body using a reference detector. The reference detector receives radiation alternatively from the test object and the reference black body.

SUMMARY

Detection of a breach in security of an enclosure is indicated by a change in a closed status, using a detector located in a detector enclosure. The detector enclosure has a window opening and a reference body having an image slit accessible from within the detector enclosure. A radiation detector is used in association with a chopper for alternating reception between receiving radiation through the window opening in the detector and receiving radiation from the reference body through the image slit to provide two received radiation levels. An indication of the two received radiation levels or a difference between the received radiation levels is used to provide an indication of a change in the closed status of the enclosure.

DETAILED DESCRIPTION

Figure 1:
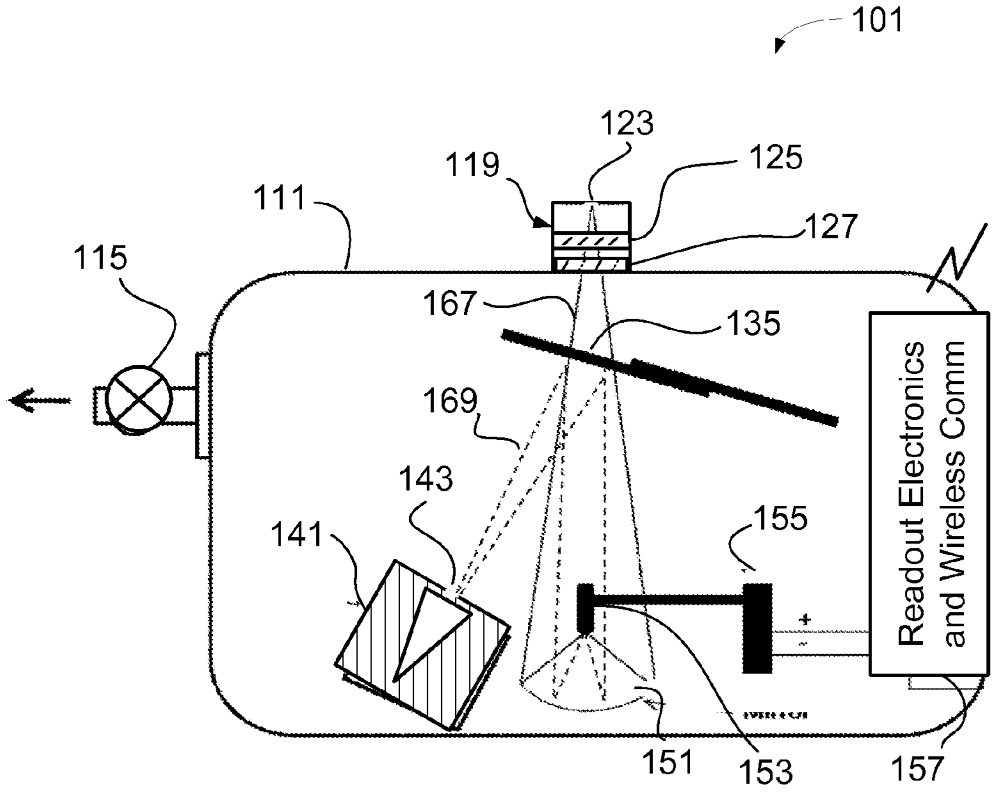
FIG. 1 is a schematic drawing of a Radiometric Cargo Security Device (RCSD) optical layout.

The U.S. economy is heavily dependent on the steady flow of commercial cargo entering both its seaports and airports, as well as transiting its roads and railways. Approximately seven million shipping containers arrive in the United States yearly and are moved inland throughout North America. Until recent years, the flow of this cargo has been only loosely tracked and regulated. The Department of Homeland Security (DHS), in a measure to secure land, sea and air borders, has embarked on a layered security construct designed to monitor and track all international shipments bound for the U.S. In addition, approximately 85% of military cargo is shipped using commercial carriers.

The Container Security Initiative (CSI), announced in January 2002 by the U.S. Customs and Border Protection (CBP), mandates that cargo bound for and transiting through the U.S. that poses potential risk to national security be examined at foreign ports and monitored throughout its transport to the final U.S. destination. CSI comprises four key elements: (1) using intelligence and automated information to identify and target containers that pose a risk; (2) prescreening cargo that poses a risk at the port of departure before it arrives at a U.S. port; (3) using detection technology to quickly prescreen containers that pose a risk; and (4) using "smarter" or tamper-evident containers.

A cargo security device (CSD) is intended to detect opening of a cargo container, such as an ISO-688 cargo container. In its simplest form, the CSD is a security seal, but at a minimum a cargo security device should detect the opening and/or removal of one or both doors of a cargo container, whether the container is empty or loaded with cargo.

In an effort to develop "smarter", tamper-evident container technologies, DHS has initiated the Advanced Container Security Device (ACSD) program. This program is intended to characterize movement and status of cargo containers as well as develop new technologies for electronic container condition monitoring that provides tamper alert signals for six-sided breach and unauthorized door openings.

As part of the ACSD effort, DHS has developed a simple, well-defined concept of what constitutes a cargo security device (CSD). At a minimum a cargo security device should detect the opening and/or removal of one or both doors of a standard ISO-688 cargo, whether the container is empty or loaded with cargo. An ACSD must satisfy the requirements of the cargo security device and, in addition, detect breaches in any of the six sides (ceiling, walls, doors and floor). These breaches may be caused by any means of cutting, burning, corrosion or impact.

Current requirements for the ACSD program specify high probability of detection (Pd >96%) with a low probability of false alarm (pfa <0.2%). Additional complications in implementing use of the device include:

The device must be retrofitted on existing steel cargo containers, and

The device is battery-powered with sufficient battery capacity to provide continuous monitoring throughout the duration of the trip. The minimum trip duration is specified at 70 days.

Currently, there are two available technologies that are practical to implement and which meet the DHS Cargo Security Requirements at any level (door or door/breach). Neither of these technologies has been able to meet the full requirements of the ACSD concept on their own, due in large part to the inherent limitations of their basic functional concepts including sensor phenomenology. Current technologies used to detect container breaches utilize devices mounted inside the container. One of these devices is an optical beam-break technology employing near IR LEDs developed by Georgia Tech Research institute and described in U.S. Published Patent Application No. 2010-0163731. A second approach is a resonant radio frequency (RF) scanning device (also referred to as a Resonant Intrusion Detector or RID) developed by Science Applications International Corporation and described in U.S. Pat. No. 7,095,326. The optical beam-break technology is only capable of detecting door openings, while the resonant RF device is capable of detecting door openings and breaches in the walls floor and ceiling. Testing has shown that the beam-break technology is fairly robust; however, the resonant RF technique is inherently susceptible to false alarms and performance instability when containers are stacked on top each other, as is common in the commercial shipping environment. The resonant RF technique is also susceptible to false alarms and performance instability if cargo shifts inside the container, as is also common due to large part in the detection phenomenology.

Since the problems faced by the resonant RF technology may be intractable for its application on a commercial scale, DHS has begun work on using the beam-break technology installed on the doors of new composite containers. These prototype containers are designed to have metal grids embedded in the floor, walls, ceiling and doors to provide door opening and breach detection. The combined beam-break and composite container technologies have the capability to meet the requirements of door opening and breach detection of the ACSD program. A drawback to this approach is that composite containers are expensive and not commercially available in large quantities in the near term.

Persistent problems in implementing technologies that can monitor all six sides of a container and meet the DHS requirements include:

the need to detect breaches and door openings in cargo conveyances to meet the DHS requirements for cargo security; and the need to implement this new breach detection method in a technology that can be retrofitted on existing steel containers used in commercial intermodal shipping.

The disclosed techniques provide a fully automated technique for reliable detection of door openings and breaches of cargo containers, railcars and truck trailers of the type used in commercial intermodal shipping and transport and other cargo and storage devices of similar design. The present subject matter utilizes a Radiometric Cargo Security Device (RCSD) to detect changes in cargo container access. The RCSD provides the inherent operational characteristics suited to meet the security needs and regulatory requirements for shipping commercial, military or otherwise hazardous cargo in large ISO-certified containers and enclosed truck trailers. The RCSD can be used as a "stand alone" device for continuous monitoring of door openings and six-sided breach detection, or, as a supplemental sensor of the same phenomena for less-capable cargo security technologies.

All objects emit electromagnetic radiation. The magnitude and spectral characteristics of this radiation are determined by the object's temperature, shape, surface condition and spectral emissivity. Emissivity is a property of the material of which the object is composed. Radiation incident on an object may be transmitted (T), reflected (R) or absorbed (A) in accordance with Equation (1) where in terms of percentage:

$$T+R+A=1 \qquad \text{(equation 1)}$$

If the shape, surface condition and emissivity of an object are such that all incident radiation is absorbed, it is said to be a "black body". The thermal radiation for each increment of wavelength emitted by an ideal black body is given by Planck's equation:

$$W_\lambda(T)=2\pi c^2 h\lambda^{-5}(\exp(hc/\lambda kT)-1)^{-1}\ \text{watts/cm}^2\text{-}\mu\text{m} \qquad \text{(equation 2)}$$

where

T=Temperature, h=Planck's Constant, c=Velocity of light, k=Boltzmann's Constant, $W_\lambda$(T)=spectral emissive power at temperature "T"

μm=increment in wavelength (λ), given in micrometers

The energy emitted in the spectral band between λ and λ+Δλ is then given by:

$$W_\lambda(T)\Delta\lambda \qquad \text{(equation 3)}$$

For an object which is not an ideal black body, the energy absorption characteristics (absorptivity) is that fraction of incident energy which is absorbed. According to Kirchhoff's law, at thermal equilibrium (the energy absorbed by an object at each wavelength equals energy emitted), such a body will emit thermal radiation in the amount:

$$W_{0\lambda}(T)=\epsilon_\lambda W_\lambda(T) \qquad \text{(equation 4)}$$

where $\epsilon_\lambda$=spectral emissivity and $W_{0\lambda}$(T)=spectral emissive power of object (not a black body)

An enclosure (with no openings for light leakage) that is held at uniform constant temperature (thermal equilibrium) is referred to as an isothermal enclosure for which Equations (1)-(4) are ideally applicable. All energy radiated inside an ideal isothermal enclosure will obey Equation (1) at each internal surface, and in the absence of light leakage, the internal surface variations in shapes and surface preparations become insignificant.

It can be shown that for practical purposes, the internal radiative characteristics of an isothermal enclosure with an opening behaves as an ideal black body in accordance with Equation (2), provided that the opening is small compared to the total volume of the enclosure. This establishes a fundamental tenant of reference standard development and calibration methodology for black body sources and detectors. For isothermal enclosures with apertures large enough to cause the internal radiative characteristics to deviate from that of an ideal black body, Equation (4) applies where the spectral emissivity (E) is a function of the number of reflections that occur inside the enclosure as well as the reflective characteristics of the incident surfaces.

An ISO 688 cargo container (either with or without cargo inside) held at a constant uniform temperature with the doors sealed tight and no holes (apertures for light leakage) meets the conditions for an isothermal enclosure. Under these ideal conditions, the container's internal radiative characteristics will act as a true black body as described in Equation (2). If the doors are opened or a hole is introduced into the walls, ceiling or floor and significant amounts of light leakage occurs, the internal radiative characteristics will deviate from those represented by Equation (2). This deviation is measurable and represents the fundamental radiometric event sensing phenomenology enabling the functionality of the Radiometric Cargo Security Device (RCSD).

The thermal radiant properties of an object can be characterized by measuring its emissivity relative to a reference black body using a reference detector. The test object and reference black body can be at different temperatures as long the temperature of each is stable. This technique has been used since the late 1950's for infrared studies of terrain and optical materials. The key to this measurement is to employ a reference detector that is sensitive in the peak wavelength regions of the reference object radiance. As the test object, the temperature of a surface on the interior of a cargo container in most cases can vary from 275° to 320° Kelvin. FIG. 1 is a schematic conceptual drawing of a RCSD optical layout.

FIG. 1 depicts a RCSD 101 including vacuum enclosure 111, which is drawn to a vacuum, as represented by vacuum valve 115. RCSD 101 measures electromagnetic energy, which can be any type of electromagnetic energy within the device's field of view. In the example apparatus, RCSD 101 measures thermal (IR) energy. Radiation receiving port 119 admits electromagnetic (IR) energy into enclosure 111 via slit 123 through bandpass filter 125, with window 127 maintaining the integrity of vacuum enclosure 111. Inside vacuum enclosure 111 are depicted blade-type optical beam chopper 135, reference black body 141 with slit 143, mirror 151, radiation pickup 153, thermocouple 155, and electronics module 157. Radiation pickup 153 is a lens mounted in front of thermocouple 155, but is usually integral with the thermocouple 155 itself. Black body 141 is designed to achieve close to 100% absorption of energy.

Chopper 135 alternately directs (1) electromagnetic energy in the form of light from slit 123 to mirror 151 (represented by solid lines 167) and radiation pickup 153 and (2) electromagnetic energy from slit 143 in reference black body 141 to mirror 151 and radiation pickup 153 (represented by dashed lines 169). Electronics module 157 includes readout electronics for reading the output of thermocouple 155, a control for controlling chopper 135 and wireless communications circuitry.

The comparison of energy sensed at radiation pickup 153 received through slits 123 and 143 is used as a measurement of the amount of electromagnetic energy leakage into the environment of RCSD 101. If RCSD 101 is inside a shipping container or other enclosure, the comparison of energy sensed at radiation pickup 153 is an indication of energy leakage into the environment inside that enclosure. Changes in the detected energy leakage beyond a predetermined threshold are deemed to represent a change in the integrity of the enclosure with respect to a possible breach in the enclosure.

In the case of multiple enclosures being monitored by RCSD units (e.g., RCSD 101), it is possible to evaluate a breach in the integrity of the containers by including a comparison of some or all of the containers being monitored. If RCSD units on multiple enclosures indicate changes in detected energy leakage, this could be deemed to represent an indication of external environmental factors, and the threshold for determining a breach in a particular enclosure may be adjusted to account for such changes. In the example configuration, the RCSD is primarily a sensor that provides data back to a data center over the wireless/IP link provided by electronics module 157. The data center can analyze or mine the data in a suitable manner. Since some but not all enclosures may be exposed to environmental factors, this comparison can take into account the possibility of a simultaneous change in the indication of energy leakage sensed from some but not all enclosures being monitored. This adjustment may be applied for any random set of simultaneous changes in sensed change in energy leakage or can be selectively applied according to such factors as proximity of a particular container.

In the configuration of FIG. 1, the reference detector receives thermal radiation alternatively from the test object (represented by solid lines 167) and from the reference black body 141 (represented by dashed lines 169). Changes in emissivity of a cavity (container) in this case is used as the figure of merit in the determination. The reference black body radiance is reflected from the chopper 135 onto the reference detector. All parts of the RCSD are at the same temperature of the containers including the reference black body. The chopped reference detector signal S is obtained by adding up the radiance terms:

$$S=K[\epsilon_{\lambda O}W_{\lambda}(T_O)+R_{\lambda}W_{\lambda}(T_C)+T_{\lambda}W_{\lambda}(T_C)-W_{\lambda}(T_C)] \quad \text{(equation 5)}$$

where

S=the AC signal from the reference detector

K=the is the reference detector responsivity $T_O$ and $T_C$=the object and chopper temperatures respectively $\epsilon_{\lambda}$, $W_{\lambda}$, R and T are as described above.

The last term is the radiance from the chopper 135 which must be subtracted since we are measuring only the change in radiation as the beam is chopped. Since chopper 135 is ideally reflective in this case, the radiance is from reference black body 141 (represented by dashed lines 169) which is at the same temperature as the chopper 135 such that:

$$W_{\lambda}(T_{bb})=W_{\lambda}(T_C) \quad \text{(equation 6)}$$

where $T_{bb}$ is the reference black body temperature.

At thermal equilibrium the energy absorbed at each wavelength ($A_{\lambda}$) the energy emitted ($\epsilon_{\lambda}$) at each wavelength and Equation (1) can be re-written as:

$$R_{\lambda}+T_{\lambda}-1=-\epsilon_{\lambda} \quad \text{(equation 7)}$$

Substituting into Equation (5), the AC signal becomes:

$$S=K\epsilon_{\lambda}[W_{\lambda}(T_O)-W_{\lambda}(T_C)] \quad \text{(equation 8)}$$

Here, Equation (5) represents the fundamental equation of operation for the RCSD. Equation (8) represents the special case where the container door is sealed the object signal (container interior) is that of a black body ($\epsilon_{\lambda O}=\epsilon_{\lambda bb}$). In the typical case where the chopper 135, reference black body 141 and the enclosure in which RCSD 101 is mounted are at the same temperature ($T_O=T_C$) this signal should be zero.

In the case where the container door is not sealed or there is are on or more significant holes in the walls, ceiling or floor Equation (5) looks like:

$$S=K[\epsilon_{\lambda O}W_{\lambda}(T_O)-\epsilon_{\lambda bb}W_{\lambda}(T_C)] \quad \text{(equation 9)}$$

Typically $T_O=T_C$ and Equation (9) becomes:

$$S=KW_{\lambda}(T_O)[\epsilon_{\lambda O}-1] \quad \text{(equation 10)}$$

where $$\epsilon_{\lambda bb}=1.$$

It is anticipated that the RCSD will be capable of resolving $\epsilon_{\lambda}$ values as low as 0.005 as represented in Equation (10). The differential between signal values represented in Equation (8) and Equation (10) therefore can be a sensitive measure of change in a container's internal thermal radiance properties as door openings and holes are introduced.

Figure 2:
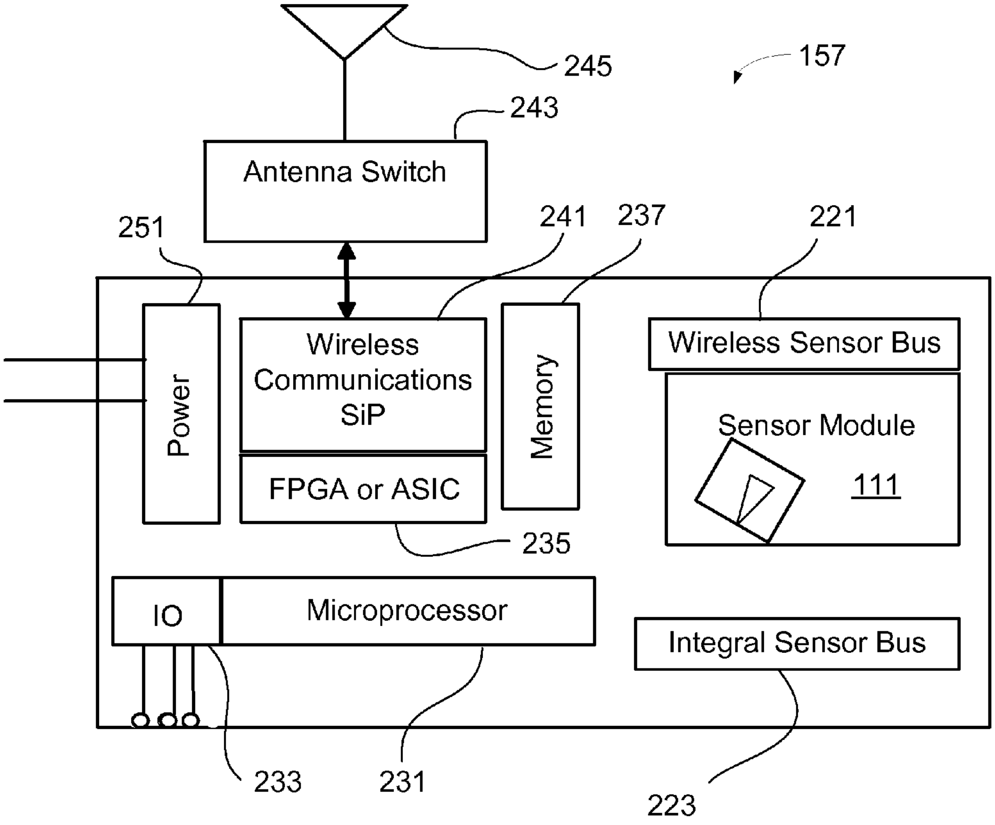
FIG. 2 is a schematic drawing of an electronics module used in association with the RCSD of FIG. 1.

The electrical subsystems of the RCSD can be seen in FIG. 2. FIG. 2 depicts electronics module 157 used in association with RCSD 101, in which enclosure 111 is represented as the sensor module. Depicted are wireless sensor bus 221, integral sensor bus 223, microprocessor 231 with I/O port 233, field programmable gate array (FPGA) or ASIC 235 and memory 237. Also depicted are wireless communications interface 241, antenna switch 243 and antenna 245. Wireless sensor bus 221 provides link to non-integral (external) wireless sensors. Integral sensor bus 223 provides wired links, including links to integral sensors or other embedded sensors, such as temperature or pressure sensors to monitor the temperature or vacuum pressure. Both buses 221, 223 feed data to microprocessor (231). The RCSD can either be battery-operated (251) or receive power from on-board power generator if available, or both. After the RCSD (101, FIG. 1) is mounted, it is activated using wireless interface 241. The device may incorporate any wireless interface communications protocols including but not limited to IEEE 802.15.4, IEEE 802.11.x and ISO 18000-7.

Figure 3:
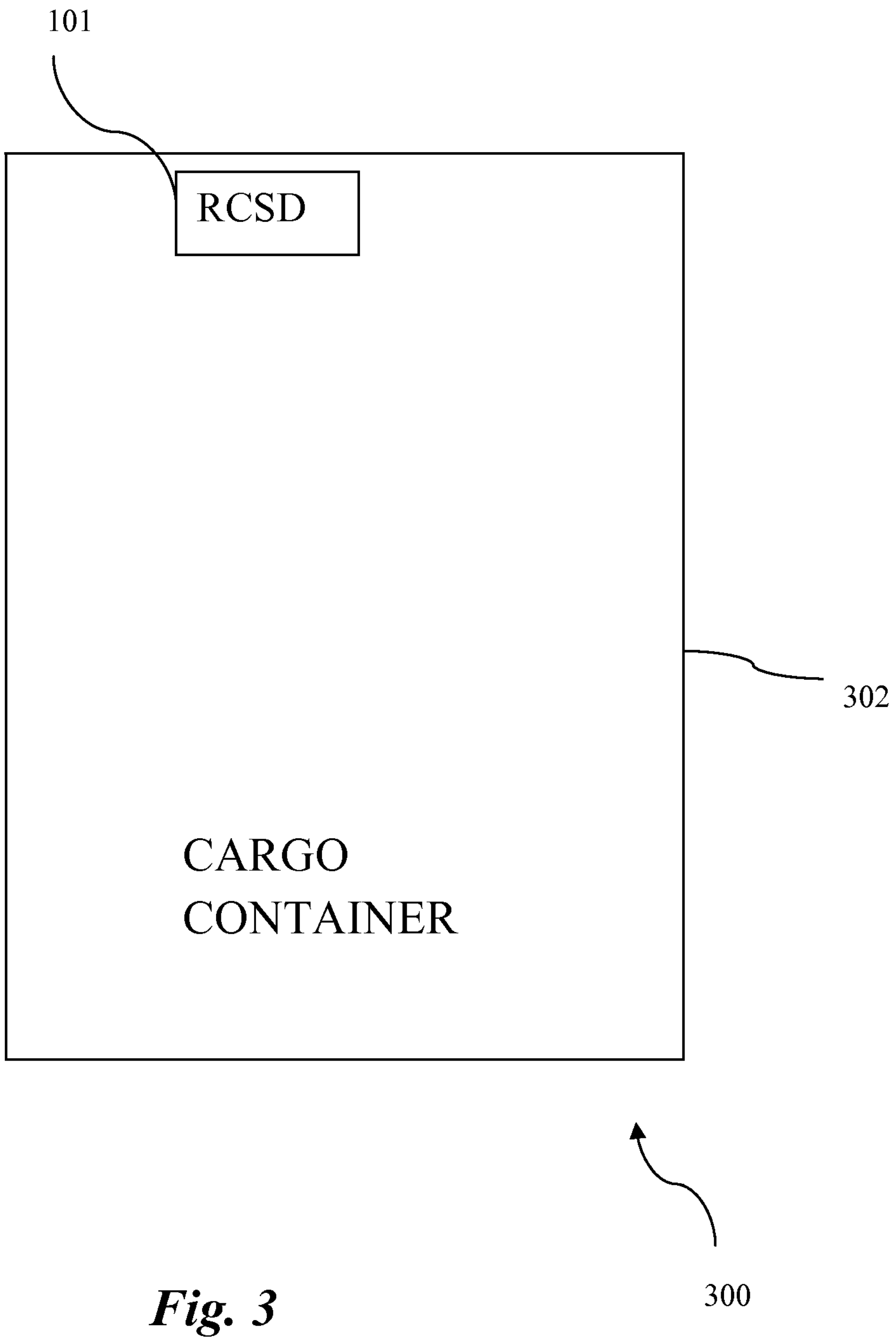
FIG. 3 is a cross-sectional block diagram of a cargo container system.

Operation of the device includes detecting radiation from outside of a detector enclosure, but within the container, and detecting radiation from an internal reference body. The RCSD is designed to be mechanically mounted on the header beam above the door on the inside of an ISO 688 container. FIG. 3 shows a cross-sectional block diagram of a commercial cargo container system 300 (such that the doors are not shown). The system 300 includes cargo container 302 and RCSD 101 mounted or contained within cargo container 302. The method of mounting RCSD 101 within cargo container 302 can include but is not limited to use of bolts, screws, adhesives, adhesive impregnated tape or welds. The method of mounting may include either electrically grounded to the container itself or electrically isolated. The RCSD 101 may be mounted in other locations inside of an ISO 688 container 302 when employed as a supplemental sensor. The mounting methods in other locations or conveyance forms will be similar with likely modifications of the conveyance to mimic the ISO 688 container header in both size and mechanical strength. RCSD 101 can detect the opening and/or removal of one or both doors of container 302, and in addition, detect breaches in any of the six sides (ceiling, walls, doors and floor). The method of mounting RCSD 101 within a container 302 must provide sufficient capability of the device to withstand the mechanical and thermal shock consistent with transit through global and domestic trade lanes.

Referring again to FIGS. 1 and 2, once activated, optical beam chopper 135 will run continuously providing alternating energy flux between the reference black body 141 and the energy received through slit 123 on the active region of radiation pickup 153. This optical beam chopping function can be provided by a chopper 135 (as shown in FIG. 1) or any other means including an electronic shutter or vibrating tuning fork. The radiometric energy in any wavelength band ($\lambda+\Delta\lambda$) incident on the reference detector is monitored continuously during the time the RCSD is in an activated state. Any combination of filters or windows may be used for wavelength band separation and definition mounted at any point in within the optical train defined in FIG. 1. Bandwidth separation helps separate the background IR radiation at shorter wavelengths. In the example configuration, wavelengths of interest are the longer wavelengths, in the range of 1-24 microns.

Once activated, RCSD 101 monitors the radiometric conditions inside the enclosure to identify events that are indicative of door openings or enclosure breaches from signal variations interpreted in terms of Equations (5)-(10). The periodicity of the monitoring process is programmable and determined by the energy use over either the intended lifetime of the device or trip duration. When changes in the radiometric conditions are detected by RCSD 101 inside the conveyance that indicates a possible door opening or conveyance breach, RCSD 101 is capable of sending an alert message over the wireless data link and records the event in its non-volatile memory. At the conclusion of the trip, RCSD 101 is capable of downloading the event log over the wireless data link.

RCSD 101 may operate as, or in conjunction with, one or more add-on sensors/device connected through the wireless data link identified in FIG. 2. These sensors may be used to provide additional inputs to optimize the probability of event detection and minimize the probability of a false alarm. Supplemental sensors/devices such as accelerometers, light emitting diodes (LEDs) and magnetic field detectors may also be used. The LED could be used to illuminate the door in order to help differentiate between racking events and door openings. (Racking occurs on ships while rocking side to side.) Racking events can affect gaps open around the doors and can be misinterpreted as openings or breaches. These sensors are those that are hardwired and integral to the RCSD 101 itself.

RCSD 101 can be used to implement a detection phenomenology for use in a cargo security device. The application of the radiometric event phenomenology is expected to provide combined door and breach detection in a sensing system that has inherent resistance to false alarms from container stacking and cargo shift. RCSD 101 is therefore able to address a need for cargo security is the capability to detect door openings and breaches in ISO 688 containers and implement this technology on existing steel containers used in commercial intermodal shipping without modification of the container itself other than providing a mounting arrangement. Although primarily designed for use in unmodified ISO 688 containers, RCSD 101 can be employed as either a primary or secondary sensor in other types of cargo conveyances with minor modifications.

The disclosed techniques may be applied as an on-conveyance sensor to any type of system that is intended to monitor cargo security in conveyances. To implement the RCSD concept for conveyances other the ISO 688 dry containers, modifications of the conveyance for mechanical mounting may be required. RCSD 101 is suitable for additional applications that may include, but are not restricted to, alternative designed cargo dry containers, refrigerated cargo containers, air cargo containers, truck trailers and railcars.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. Apparatus for detecting a breach in security of an enclosure as indicated by a change in a closed status, the apparatus comprising:
- a detector enclosure where the enclosure is held at a relatively constant uniform temperature;
- a window opening in the detector enclosure;
- a reference black body emitter having an image slit accessible from within the detector enclosure, the reference black body emitter having peak wavelength regions of radiance;
- an IR radiation detector that is sensitive in the peak wavelength regions of the reference body emitter radiance;
- a reflective chopper capable of alternating reception by the radiation detector between receiving radiation through the window opening in the detector and receiving radiation from the reference body emitter through the image slit;
- a circuit capable of providing an indication of radiation levels of the received radiation through the window opening and the received radiation from the reference black body emitter through the image slit or a difference between the received radiation levels, whereby a change in reception through the window opening provides an indication of a change in the closed status of the enclosure.

2. The apparatus of claim 1, further comprising:
- a wireless communication link capable of transmitting detected changes corresponding to possible change in the closed status of the enclosure.

3. The apparatus of claim 1, further comprising:
- a wireless communication link capable of transmitting an indication of the received radiation levels, thereby permitting external detection of a possible change in the closed status of the enclosure.

4. The apparatus of claim 1, wherein the enclosure comprises a shipping enclosure.

5. Method for detecting a breach in security of an enclosure as indicated by a change in a closed status, the method comprising:
- providing a detector enclosure having a window opening and where the enclosure is held at a relatively constant uniform temperature;
- providing a reference black body emitter within the detector enclosure and having an image slit accessible from within the detector enclosure, the reference black body emitter having peak wavelength regions of radiance;
- detecting IR radiation in the detector enclosure that is sensitive in the peak wavelength regions of the reference body emitter radiance by alternating reception between receiving radiation through the window opening in the detector enclosure and receiving radiation from the reference body through the image slit;

providing an indication of the two received radiation levels or a difference between the received radiation levels, whereby a change in reception through the window opening provides an indication of a change in the closed status of the enclosure.

6. The method of claim 5, further comprising:

using a wireless communication link to transmit detected changes corresponding to possible change in the closed status of the enclosure as indicated by changes in the received radiation.

7. The method of claim 5, further comprising:

using a wireless communication link to transmit an indication of the received radiation levels, thereby permitting external detection of a possible change in the closed status of the enclosure.

8. A cargo container system comprising:

a detector enclosure for detecting door openings or a breach in security of a cargo container as indicated by a change in a closed status, the detector enclosure contained within the cargo container where the cargo container is held at a relatively constant uniform temperature and including:

a window opening in the detector enclosure;

a reference black body emitter having an image slit accessible from within the detector enclosure, the reference black body emitter having peak wavelength regions of radiance;

an IR radiation detector that is sensitive in the peak wavelength regions of the reference body emitter radiance;

a reflective chopper capable of alternating reception by the radiation detector between receiving radiation through the window opening in the detector and receiving radiation from the reference body through the image slit;

a circuit capable of providing an indication of radiation levels of the received radiation through the window opening and the received radiation from the reference black body emitter through the image slit or a difference between the received radiation levels, whereby a change in reception through the window opening provides an indication of a change in the closed status of the cargo container.

9. The apparatus of claim 8, further comprising:

a wireless communication link capable of transmitting detected changes corresponding to possible change in the closed status of the cargo container.

10. The apparatus of claim 9, further comprising:

the wireless communication link capable of transmitting an indication of the received radiation levels, thereby permitting external detection of a possible change in the closed status of the cargo container.

* * * * *